Patented Mar. 30, 1943

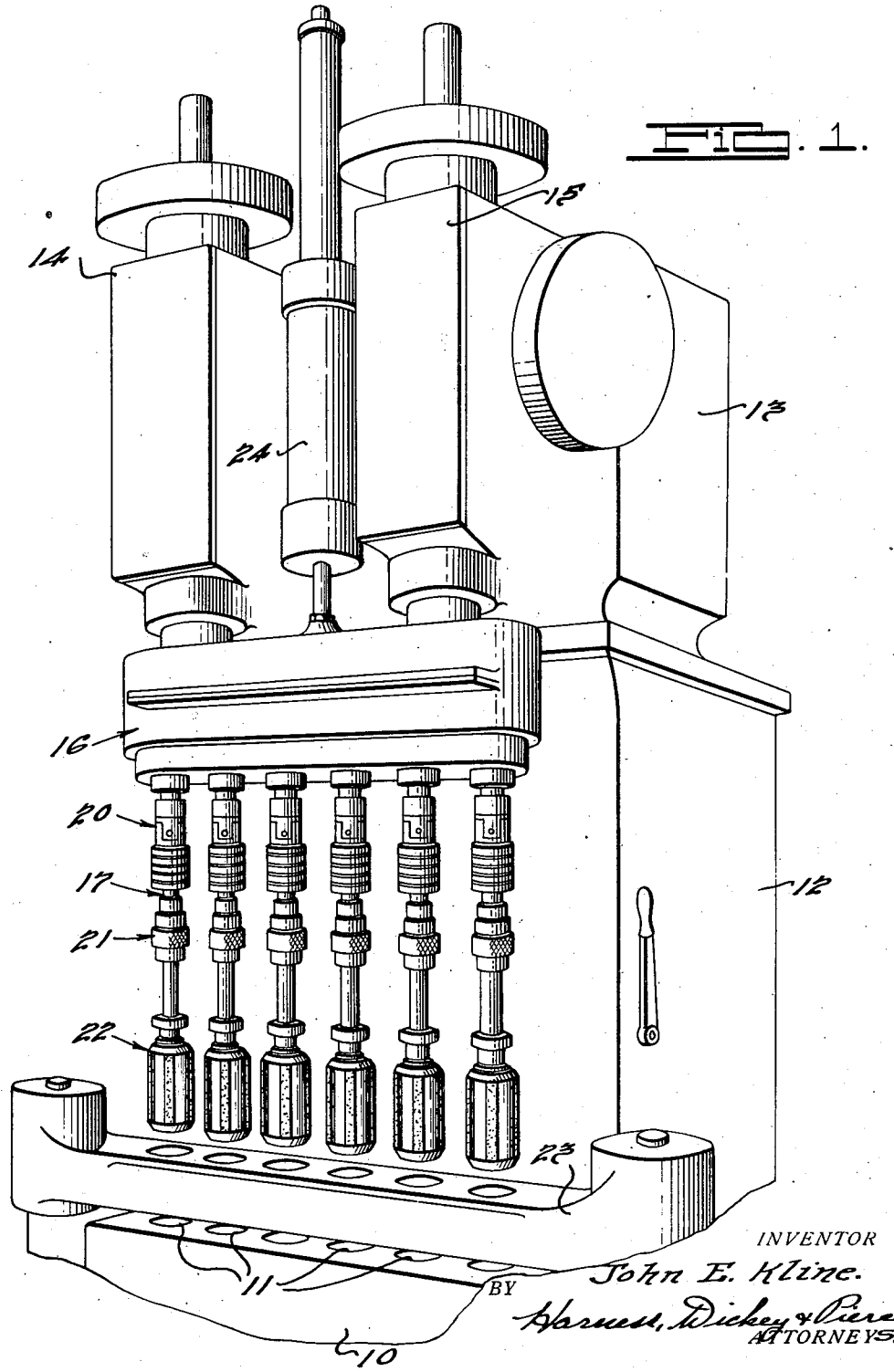

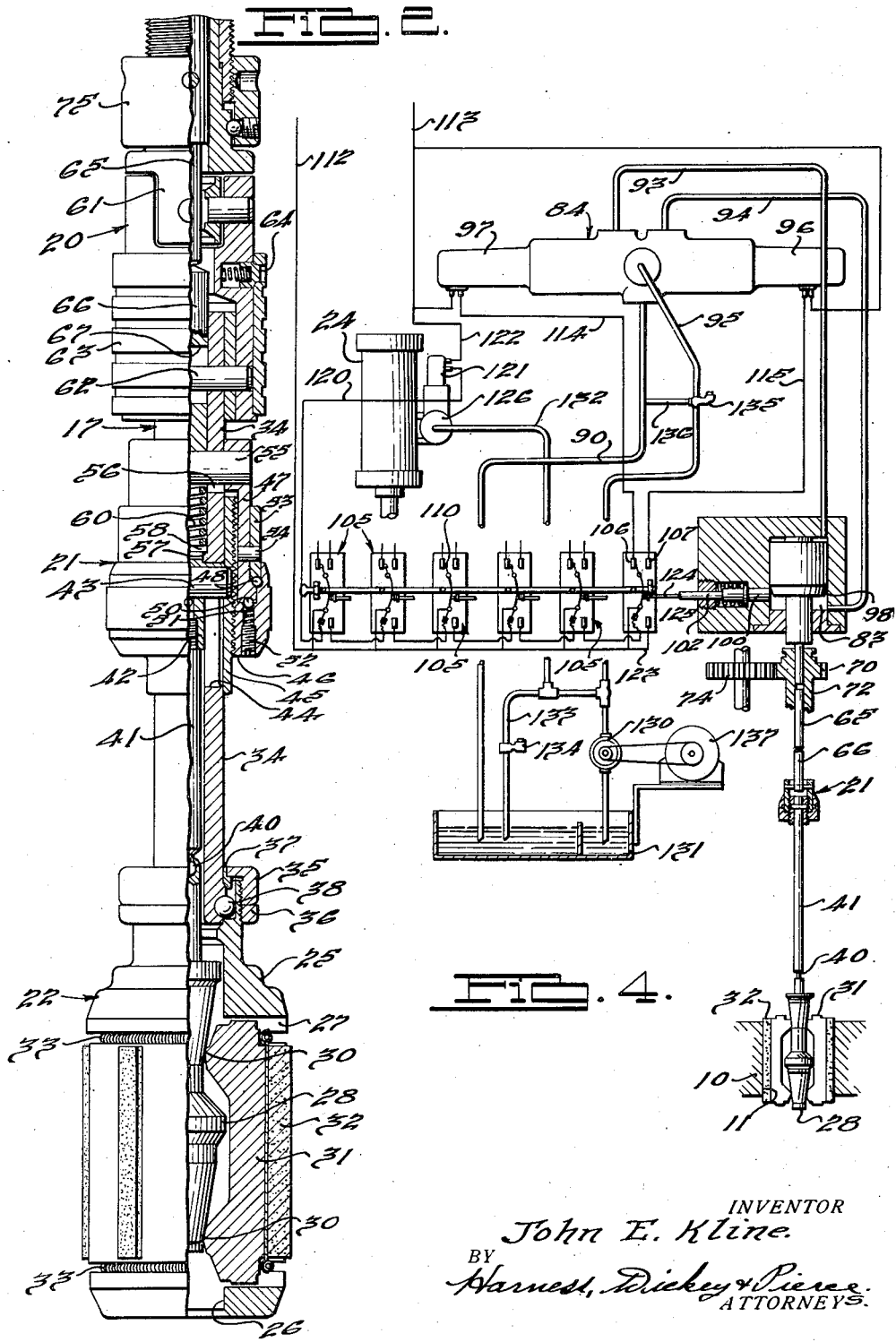

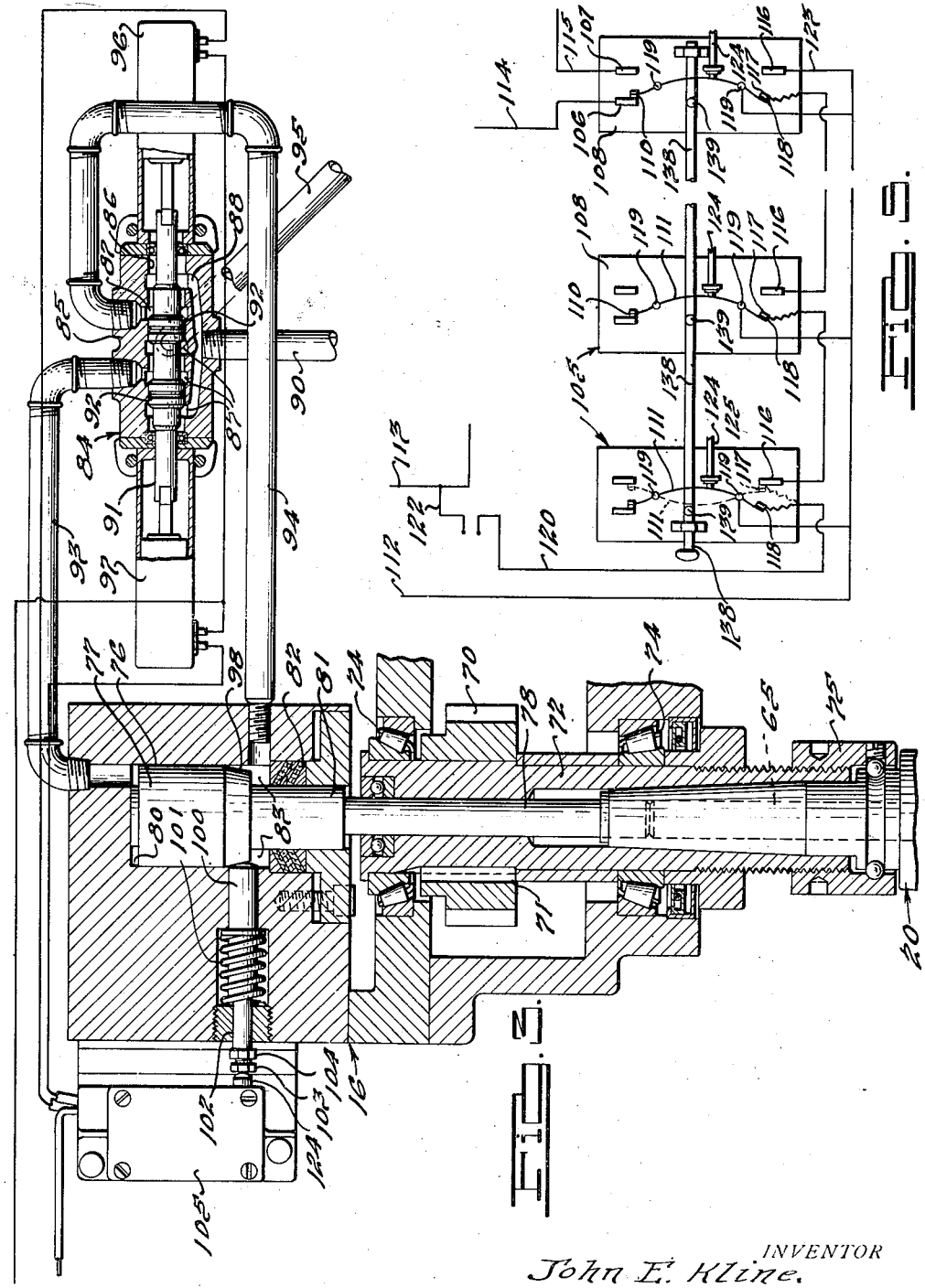

2,315,062

UNITED STATES PATENT OFFICE 2,315,062

METHOD AND MEANS FOR CONTROLLING HONING OPERATION BY EXPANSION

John E. Kline, Grosse Pointe Farms, Mich., assignor to Micromatic Hone Corporation, Detroit, Mich., a corporation of Michigan Application February 18, 1939, Serial No. 257,088

10 Claims. (Cl. 51—184.3)

This invention relates to grinding machines and especially to mechanism for individually and collectively controlling the abrading tools of a multiple spindle machine.

The principal object of the invention is to improve the art of grinding machines.

It is also an object of the invention to provide control means for each abrading tool of a multiple spindle machine for causing such tool to effect the operation for which it is set and then contracting the abrading heads of each tool upon completion of such operation.

A further object is to provide individual control means for each abrading tool of a multiple spindle machine which renders each tool effective until the predetermined operation for that tool has been completed, then retracts all of the abrading tools when the desired operations have been effected.

Another object is to provide each abrading tool of a multiple spindle machine with a working expansion limiting means for maintaining each tool effective until full limit expansion operation for which it has been set is completed in conjunction with control means for retracting all tools when all operations for which the tools were preset has been effected, and further to provide each tool with manually adjustable positive stop expansion limiting means effective as a safety stop for limiting expansion of the tool to a slightly greater amount in the event that the working expansion limiting means fails to operate.

Other objects, features and advantages will become apparent from the following description and appended claims.

For the purpose of illustrating the genus of the invention, a concrete embodiment is illustrated in the accompanying drawings, in which:

Figure 1 is a perspective view of a multiple spindle grinding machine constructed in accordance with the principles of this invention;

Fig. 2 is a side elevation with parts broken away and shown in section of one of the tool spindles depicted in Fig. 1;

Fig. 3 is a central vertical section taken centrally through drive and control means of one of the spindles depicted in Fig. 1, the associated parts being shown in elevation or in partial section;

Fig. 4 is a diagrammatic view illustrating the control system for the multiple spindle grinding machine depicted in Fig. 1, and Fig. 5 is an enlarged diagrammatic illustration of switch mechanism shown in Fig. 4.

Referring to the drawings, and more especially to Fig. 1, the numeral 10 represents the work piece in the form of a cylinder block 10, having a plurality of cylinder bores 11 which are to be ground, honed, or polished, such work piece being indicative of any multiple cylinder block of a gas engine, steam engine, or compressor, or similar apparatus and adapted to be held stationary on an appropriate support of the machine illustrated by any suitable fastening means, not shown. The abrading machine comprises an upright column 12 terminating at its upper end in a main housing 13, having an auxiliary housing 14 and 15 extending forwardly from the upper end of the column for housing spindle drive mechanism journaled in a reciprocating carriage or head 16 for a plurality of spindles 17 each comprising a driving portion 20, manually adjustable expansion stop means 21 and an abrading head 22. A guiding bracket at 23, preferably integrally built into the work holding fixture of the work piece 10, is provided for centering and guiding the abrading tools into the bores 11 of workpiece 10. A hydraulic cylinder 24 is disposed between the auxiliary housings 14 and 15 for moving the reciprocating carriage or head 16 toward and away from the workpiece for the purpose of moving the abrading tools into and out of the bores 11 of such workpiece 10.

Reference may now be had to Fig. 2 in which the numeral 25 represents the body of the head portion 22 of the abrading tool and such body is provided with an axial bore 26, a plurality of radial longitudinal driving grooves 27 extending through the body 25. A double cone 28 is axially movable within the bore 26 and makes a double contact at points 30 with stone holder 31, each of the latter carrying a stone 32 provided with end clips and maintained in assembled relation with respect to the stone holders by means of band or garter springs 33. The pitch of the double cone 28 is beyond the angle of reversibility, allowing the expansion mechanism to advance the cone, but preventing any amount of external pressure on the stones from reversing the action. This, in conjunction with the two point contact with the stone holders, assures straight cylinders and prevents the stones from following tapered or irregular bores. The upper end of the body 25 is externally threaded and secured by means of a rocker connection to the shank 34. The rocker connection comprises a threaded sleeve 35, lock nut 36, packing 37, and anti-friction members 38. The upper end of the double cone 28 is connected by means of a universal joint 40 to a spindle 41. The rocker connection between the shank 34 and body 25, in conjunction with the universal joint 40, permits uniform transfer of expansion pressure to the abrading tool and compensates for slight misalignment of the work with relation to the axis of the machine spindle. The upper end of the spindle 41 is threadedly connected to a pin holder 42 for a pin 43 which projects through a slot 44 in the shank 34 and into an adjusting sleeve 45. The adjusting sleeve 45 is externally threaded and threadably engages a knurled adjusting nut 46. The adjusting nut 46 is connected in a rotatable but not axially movable manner relative to a sleeve 47 by anti-friction members 48 and 50, the anti-friction balls 50 being biased upwardly into contact with the lower end of the sleeve 47 by means of springs 51 and adjusting studs 52, and the anti-friction members 48 being maintained in position by means of a sleeve 53 pinned to the sleeve 47 by means of pins 54. A pin 55 fixed to the sleeve 47 extends through a slot 56 provided in the shank 34, the gap between the pin 55 and the base portion of the slot 56 constituting the safety positive stop limiting means for regulating the expansion of the abrading tool in the event of failure of working expansion limiting means, later described, to function. The stop gap may be adjusted by rotating the knurled adjusting nut 46 which, due to its threaded engagement with the adjustment sleeve 45, opens or closes the gap between the lower surface of the pin 55 and the bottom of the slot 56. Such positive stop expansion limiting means of the abrading tool is intended to be set slightly beyond the working stop limiting means, to be explained later, and to be employed only as a safety means to prevent grinding or honing a cylindrical opening materially oversize. The upper bore of the shank 34 is enlarged slightly to provide a shoulder 57 adapted to support a washer 58 and the lower end of a recoil spring 60, the upper end of which abuts a pin 55 to effect contraction of the abrading tool head when compression on the expanding means, later described, is relaxed.

The driver 20 of the abrading tool includes a universal joint 61 and is connected to the upper end of the shank 34 by means of a pin 62 adapted to be maintained in assembled relation with respect to the driver and shank 34 by means of a sleeve 63 and the latter is adapted to be locked in position by means of a spring pressed detent 64. As previously indicated, the head assembly 22 contains all the expansion, actuating, and adjusting units, and the expansion of the abrading stones 32 is effected by hydraulic pressure on the push rod 65 by fluid pressure mechanism in the reciprocating carriage or head 16, depicted in Figure 1. This actuating pressure, carried through the center of the driver 20, automatically actuates the drive shaft push rod 66 and advances the double cone expander 28 through the adjustment mechanism included in the adjusting unit indicated generally at 21. A slot 67 is cut through the drive shaft push rod 66 to permit axial movement of the latter without interference with the pin 62.

Reference may now be had to Fig. 3 which indicates the fluid pressure responsive mechanism for effecting expansion of the abrading tool, control means for such fluid pressure responsive mechanism and rotating drive mechanism for the tool spindle. Each abrading tool is rotatably driven by means of a gear 70, keyed, as indicated at 71 in Fig. 3, to a drive sleeve 72 journaled by means of thrust bearings 74 to the reciprocating carriage or head 16. The gears 70 are driven by gearing 73, indicated diagrammatically in Figure 4, and such gearing is driven from spindle drive mechanism housed within the auxiliary housings 14 and 15 of the abrading machine illustrated in Figure 1. The gear sleeve 72 is threaded at its lower end and clamped to the driver 20 by means of the clamping sleeve 75 threadably engaging the lower end of gear sleeve 72. Cylinder bores 76 are provided in the upper portion of the reciprocating carriage or head 16 in axial alignment with the axes of each of the tool spindles. A piston 77 is disposed in each of the cylinders 76 and is provided with a downwardly and axially extending stem 78 adapted to transmit pressure from the fluid compression chamber 80, which lies between the piston 77 and the closed or blind end of the cylinder 76, to the upper end of the push rod 65 for the purpose of expanding the abrading tool 22. Each piston stem 78 is provided with an enlarged portion 81 projecting through a stuffing box 82 which seals and closes the lower end of its cylinder 76. This arrangement also provides a fluid pressure expansion chamber 83 between the stuffing box 82 and the lower end of the piston 77 so that when fluid pressure within the latter chamber exceeds that in the fluid pressure chamber 80 the piston 77 will be elevated and allow the recoil spring 60 to collapse the abrading head 22. A solenoid operated valve, indicated generally at 84 in Figure 3, controls the admission of fluid pressure to the compression chambers 80 and 83 disposed at opposite ends of each piston 77. Each valve 84 comprises a cylindrical casing 85 provided with a central bore 86 which in turn is provided with five substantially equally spaced annular grooves 87. The return passage 88 connects the extreme right and left hand annular grooves 87 with each other but communicates with none of the other annular grooves 87. A return conduit 90 leads from the fluid return passage 88 to the source of pressure fluid as indicated in Figure 4. A plunger 91, provided with a pair of spaced piston portions 92, is disposed in the bore 86 with the pistons 92 so spaced that when the plunger 91 is moved to the extreme right or left hand position within the bore 86, one piston will shut off communication between the adjacent outside annular grooves 87 at one end of the bore 86 while the adjacent outside annular grooves 87 at the other end of the bore 86 will be in communication with each other and the centrally arranged annular groove 87 will be in communication with the next adjacent annular groove on the other side. As illustrated in Fig. 3, the plunger 91 is moved to its extreme left hand position with the left hand piston 92 closing communication between the adjacent grooves at the left hand end of the bore 86 and with the next to left hand groove 87 in communication with the central groove 87 while the right hand piston 92 closes the central groove 87 with respect to the next right hand groove 87 and the latter groove is in communication with the extreme right hand groove 87. A conduit 93 communicates with the next to the left hand annular groove 87 and with the fluid pressure chamber 80, while a conduit 94 communicates with the next to right hand annular groove 87 and the fluid pressure chamber 83. The pressure supply conduit 95 communicates between a pressure fluid and the central annular groove 87. Thus, with the plunger 91 in the position indicated, pressure fluid will flow from the conduit 95 through the central annular groove 87 to the next left hand annular groove 87, and through the conduit 93 to the fluid pressure chamber 80 and force the piston 77 downwardly to expand the abrading tool. At this time, the left hand piston 92 cuts off communication between the left hand groove 87 and the next to the left hand groove 87 so that there will be flow between the pressure supply and the return line and the right hand piston cuts off communication between central annular groove 87 and the next right hand annular groove. The latter annular groove, however, is in open communication with the right hand annular groove 87 and the return passage 88 so that pressure chamber 83 will be in communication through the conduit 94 and return passage 84 with the return line 90. Movement of the plunger 91 to the extreme right hand position will place compression chamber 83 in communication with the pressure supply counter 95 and the pressure chamber 80 in communication with the return line 90. This will elevate the piston 77 and allow the recoil spring 60 indicated in Fig. 2 to cause contraction of the head of the abrading tool.

Solenoids 96 and 97 are provided at the right and left hand ends respectively of valve 84, as indicated in Figs. 3 and 4, and in the indicated position solenoid 97 is in energized condition while solenoid 96 is deenergized and pressure supply conduit 95 is in communication with pressure chamber 80 to effect expansion of the abrading tool.

The working expansion limiting means for the abrading tool is actuated by downward movement of the piston 77 and to this end the lower end of piston 77 is beveled or tapered, as indicated at 98 in Figs. 3 and 4. A plunger 100 biased by means of a spring 101 toward the bevel 98 of piston 77 is arranged in a suitable bore provided in the reciprocating carriage or head 16 and is provided with a stem 102 to which is threaded an adjusting stud 103 adapted to be secured in adjusted position by means of a lock nut 104. The stud 103 is adapted to be adjusted and locked in the desired adjusted position to regulate the overall length of the plunger 100 so that the latter, at the proper time, operates the micro switch 105 when the piston 77 has descended the proper amount to effect the desired expansion of the abrading tool.

Reference may now be had to Figs. 4 and 5 which depict the control system of a reciprocating carriage 16 and the six abrading tool spindles carried thereby. As indicated in Fig. 4, a micro switch 105 is provided for each of the tool spindles and each micro switch 105 controls the operation of a piston 77 through a solenoid operated valve 84, but one piston and solenoid operated valve being illustrated. Fig. 5 illustrates diagrammatically the two left hand micro switches 105 and the extreme right hand micro switch 105, shown in Fig. 4. Each of the switches 105 include a pair of stationary contacts 106 and 107 mounted on a base plate 108 and adapted to be contacted by a terminal contact 110 carried by a snap spring conductor 111 which normally maintains the contact 110 in engagement with the stationary contact 106. The snap spring conductors 111 are all connected to a power line 112 leading to a suitable source of electrical energy, not shown. Another power line 113 leads to one terminal of each of the solenoids 96 and 97 of each solenoid operated valve 84. The stationary contacts 106 are connected by conductors 114 to the remaining terminals of the solenoids 97 while the stationary contacts 107 are connected by means of conductor 115 to the remaining terminals of solenoids 96. A third stationary contact 116 is mounted on each switchboard 108 of the micro switches 105 and is adapted to be engaged by a contact 117 carried by the snap spring conductor 111 when the terminal contact 110 engages the stationary contact 107. The snap spring conductors 111 are longitudinally forced to bowed condition between pivots 119 to engage contacts 110 and 106 or to engage contacts 110 with contacts 107 and contacts 117 with contacts 116. It is noted that the contacts 117 are insulated by means of insulation 118 from the snap spring conductors 111. The contact 117 of the extreme left hand micro switch 105 is connected by means of a conductor 120 to a solenoid 121, the remaining terminal of the solenoid 121 being connected by means of a conductor 122 to power line 113. The stationary contacts 116, except for that of the right hand switch, are each connected to the contacts 117 of the next microswitch to the right as viewed in Fig. 4. The contact 116 of the extreme right hand micro switch 105, as viewed in Fig. 4, is connected by means of a conductor 123 with the power line 112. Each micro switch 105 is provided with a switch actuating plunger 124 provided with an insulated tip 125 and these plungers are adapted to be actuated through the plungers 100, by pistons 77 to snap the spring conductors 111 to the left, as viewed in Fig. 4, in order to break contact between the terminal contacts 110 and stationary contacts 106 and cause the terminal contacts 110 to engage the stationary contacts 107 and also to cause the contacts 117 to engage the stationary contacts 116. The solenoid 121 is adapted to operate a valve 126 controlling admission of fluid under pressure to either end of the cylinder 24 for lowering or elevating the reciprocating carriage or head 16. It is noted that the solenoid 121 is energized when all of the pistons 77 have been lowered to completely expand the abrading tools to the desired working limit to which the adjustment plungers 100 have been set and all of the micro-switches 105 operated to snap the spring conductors 111 to the left hand position, as viewed in Fig. 4. This closes the circuit from the power line 112 through the snap spring conductors 111, contacts 117 and 116, conductor 120, the solenoid coil and conductor 122 completing the circuit to the other power line 113. This causes the solenoid 121 to be energized and operate the valve 126 so that hydraulic cylinder 24 will elevate the reciprocating carriage or head 16 and remove the abrading tools from the work piece and guiding bracket 28. The valve 126 may be operated in the opposite direction by spring, gravity, or other desired means to cause the hydraulic cylinder 24 to lower the reciprocating head 16.

The pump 130 is interposed in the pressure conduit 95 between a fluid tank 131 and the solenoid operated valve 84. The return conduit 90 leads back to the fluid tank 131. The pressure conduit 132 may lead from the pressure conduit 95 between the pump 130 and the solenoid operated valve 84 to the control valve 126 or hydraulic cylinder 24. A return line 133 leads from the fluid pressure line 132 back to the tank 131 and a pressure regulator 134 may be interposed in this return line for regulating the pressure of the fluid supply to the control valve 126. A pressure regulator 135 may also be interposed in the pressure conduit 95 between the pump 130 and the solenoid operated valves 84, the return conduit 136 leading from the pressure regulator 135 to the return conduit 90. A motor 137 or other suitable driving means is provided for operating the pump 130.

During operation of the abrading machine, the tool spindles 17 are rotated through gearing 74 and the spindle drive mechanism contained within the housings 14 and 15. Fluid under pressure supplied from the tank 131 by means of pump 130 backs through the control valve 126, solenoid 121 being deenergized at this time, to lower the spindle head 16 and lower the tool spindle 17 through the guiding bracket 23 and into the bores 11 of work piece 10. Fluid under pressure is also supplied from the pump 130 through the pressure conduit 95 to the solenoid operated valves 84 and conduits 93 to the pressure chambers 80 for each of the two expanding pistons 77 in order to effect expansion of the abrading tool heads 22. At this time, all of the micro switches 105 are in the positions indicated in Fig. 4 with the solenoids 97 energized and the solenoid operated valves in the position indicated in Fig. 3. The solenoids 97 are energized by the electrical circuits including the power line 112, snap spring conductor 111, terminal contacts 110, stationary contacts 106, and conductors 114, the solenoid coils completing the circuit through the solenoids 97 to the power line 113. Fluid pressure within the pressure chambers 80, forces pistons 77 downwardly until each abrading tool head 22 has been expanded to the working limit for which the adjustable plunger 100 has been set, so that when each plunger 77 has been lowered sufficiently to snap its micro switch 105 to the left hand position indicated in dotted line in the left hand switch 105 of Fig. 5, breaking engagement between the terminal contact 110 and stationary contact 106, the solenoids 97 will be deenergized. The micro switches 105 are operated individually as soon as the abrading tool associated with each switch is expanded to the preset working expansion limit and operates its micro switch. Operation of a micro switch brings the terminal contact 110 into engagement with stationary contacts 107 in order to energize the solenoids 96 through the power circuits including the power line 112, the spring conductors 111, terminal contacts 110, conductors 115, and completes the circuit of the power line 113 through the coils of the solenoids 96. As soon as all of the micro switches 105 have been thrown to the left hand position, the circuit is closed between the power line 112 through the conductor 123 of the extreme right hand micro switch 105 to the contacts 117 which at this time engages the stationary contacts 116 of that switch and thence through all of the contacts 117 and 116 of the other switches to the conductor 120, the winding of the solenoid 121 and conductor 122 to the power line 113. This effects energization of solenoid 121 and reverses the action of control valve 126 causing the hydraulic cylinder 24 to elevate the spindle head 16. Energization of the soleoids 96 has in the meantime caused fluid pressure delivered from the pump 130 through the solenoid operated valves 84 and conduits 94 to the pressure chamber 83 to elevate the piston 77 in order to cause contraction of the tool heads 22 prior to their withdrawal from the bore 11 of the work piece 10. As soon as all of the pistons 77 have been elevated to the uppermost position, the springs 101 for control plungers 100 have returned the latter to their right hand position. A slide bar 138 provided with pins 139 engageable with each snap spring conductor 111 of the micro switches may be moved to the right to return the snap springs 111 to the positions depicted in full line in Figs. 4 and 5. This places the abrading machine in condition to perform the desired operation upon the next work piece.

Many changes could be made in the above described constructions, and many apparently widely different embodiments could be had without departing from the spirit and scope of the present invention, it is intended that all matter contained in the above description or shown in the accompanying drawings shall be interpreted as illustrated and not in a limiting sense.

What is claimed is:

1. In a grinding or honing machine, in combination, a reciprocating tool support, a spindle journaled at one end on said support and adapted to carry on its other end an expansible and contractable abrading tool, tool adjusting means on said support including expansible and contractable fluid pressure responsive means for expanding and contracting the abrading tool, a source of pressure fluid for said fluid pressure responsive means, valve means for directing pressure fluid from said source selectively into either end of said fluid pressure responsive means selectively to expand or contract the abrading tool, and means operable in response to a predetermined expansive movement of said fluid pressure responsive means for operating said valve means.

2. In a grinding or honing machine, in combination, a reciprocating tool support, a spindle journaled at one end on said support and adapted to carry on its other end an expansible and contractable abrading tool, tool adjusting means on said support including expansible and contractable fluid pressure responsive means for expanding and contracting the abrading tool, a source of pressure fluid for said fluid pressure responsive means, valve means for directing pressure fluid from said source selectively into either end of said fluid pressure responsive means selectively to expand or contract the abrading tool, and means operable in response to predetermined expansive movement of said fluid pressure responsive means for reversing the operation of said valve means.

3. In a grinding or honing machine, in combination, a reciprocating tool support, a spindle journaled at one end on said support and adapted to carry on its other end an expansible and contractable abrading tool, tool adjusting means on said support including expansible and contractable fluid pressure responsive means for expanding and contracting the abrading tools, a source of pressure fluid for said fluid pressure responsive means, valve means for directing pressure fluid from said source selectively into either end of said fluid pressure responsive means selectively to expand or contract the abrading tool, and adjustable means operable in response to expansive movement of said fluid pressure responsive means to selective limits for reversing the operation of said valve means.

4. In a grinding or honing machine, in combination, a reciprocating tool support, a spindle journaled at one end on said support and adapted to carry on its other end an expansible and contractable abrading tool, tool adjusting means on said support including a fluid cylinder, a piston in said cylinder, means operable by said piston for expanding and contracting the abrading tool, a source of pressure fluid for said cylinder, valve means for directing the pressure fluid from said source into either end of said cylinder selectively to expand or contract the abrading tool, and means operable in response to predetermined movement of said piston to operate said valve means.

5. In a grinding or honing machine, in combination, a reciprocating tool support, a plurality of spindles each journaled at one end on said support and adapted to carry on its other end an expansible and contractable abrading tool, a tool adjusting means for each tool on said support including expansible and contractable fluid pressure responsive means for expanding and contracting each abrading tool, a source of pressure fluid for all of said fluid pressure responsive means, a valve means for each of said fluid pressure responsive means for directing pressure fluid from said source selectively into either end of each of said fluid pressure responsive means to expand or contract one of the abrading tools, and a plurality of means each operable in response to expansive movements of one of said fluid pressure responsive means to a selected limit for reversing the operation of the valve means therefor.

6. In a grinding or honing machine, in combination, a reciprocating tool support, a plurality of spindles each journaled at one end on said support and adapted to carry on its other end an expansible and contractable abrading tool, a tool adjusting means for each tool on said support including expansible and contractable fluid pressure responsive means for expanding and contracting each abrading tool, a source of pressure fluid for all of said fluid pressure responsive means, a valve means for each of said fluid pressure responsive means for directing pressure fluid from said source selectively into either end of each of said fluid pressure responsive means to expand or contract one of the abrading tools, and a plurality of adjustable means each operable in response to expansive movements of one of said fluid pressure responsive means to selected limits for reversing the operation of the valve means therefor.

7. In a grinding or honing machine for finishing a plurality of cylindrical surfaces in a workpiece, a reciprocating tool support, means for moving said support toward and away from the work piece, a plurality of spindles each journaled at one end on said support and adapted to carry on its other end an expansible and contractable abrading tool, a tool adjusting means for each tool on said support including expansible and contractable fluid pressure responsive means for expanding and contracting each abrading tool, a source of pressure fluid for all of said fluid pressure responsive means, a valve means for each of said fluid pressure responsive means for directing pressure fluid from said source selectively into either end of each of said fluid pressure responsive means to expand or contract one of the abrading tools, a plurality of means each operable in response to expansive movement of one of said fluid pressure responsive means to a selected limit for reversing the operation of the valve means therefor, and means operable in response to such reversal of operation of all of said valve means for causing said first named means to move said support away from the workpiece.

8. In a grinding or honing machine for finishing a plurality of cylindrical surfaces in a workpiece, a reciprocating tool support, means for moving said support toward and away from the workpiece, a plurality of spindles each journaled at one end of said support and adapted to carry on its other end an expansible and contractable abrading tool, a tool adjusting means for each tool on said support including expansible and contractable fluid pressure responsive means for expanding and contracting each abrading tool, a source of pressure fluid for all of said fluid pressure responsive means, a valve means for each of said fluid pressure responsive means for directing pressure fluid from said source selectively into either end of each of said fluid pressure responsive means to expand or contract one of the abrading tools, a plurality of adjustable means each operable in response to expansive movements of one of said fluid pressure responsive means to selected limits for reversing the operation of the valve means therefor, and means operable in response to such reversal of operation of all of said valve means for causing said first named means to move said support relative to said workpiece.

9. In a grinding or honing machine, in combination, a reciprocating tool support, a spindle journaled at one end on said support and adapted to carry on its other end an expansible and contractable abrading tool, tool adjusting means on said support including a fluid cylinder, a piston in said cylinder, means operable by said piston for expanding and contracting the abrading tool, a source of pressure fluid for said cylinder, valve means for directing the pressure fluid from said source into either end of said cylinder selectively to expand or contract the abrading tool, means operable in response to predetermined movement of said piston to operate said valve means, and positive stop means on said spindle for limiting expansion of said abrading tool in the event of failure of said last named means to act.

10. In a grinding or honing machine, in combination, a reciprocating tool support, a spindle journaled at one end on said support and adapted to carry on its other end an expansible and contractable abrading tool, tool adjusting means on said support including a fluid cylinder, a piston in said cylinder, means operable by said piston for expanding and contracting the abrading tool, a source of pressure fluid for said cylinder, valve means for directing the pressure fluid from said source into either end of said cylinder selectively to expand or contract the abrading tool, means operable in response to predetermined movements of said piston to operate said valve means, positive stop means on said spindle for limiting the expansion of said abrading tool in the event of failure of said last named means to act, and a manually adjustable means for setting said positive stop means.

JOHN E. KLINE.